United States Patent
Blawat

(10) Patent No.: US 8,988,977 B2
(45) Date of Patent: Mar. 24, 2015

(54) METHOD AND APPARATUS FOR DATA STORAGE

(75) Inventor: Meinolf Blawat, Hannover (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/539,348

(22) Filed: Jun. 30, 2012

(65) Prior Publication Data

US 2013/0003514 A1 Jan. 3, 2013

(30) Foreign Application Priority Data

Jul. 1, 2011 (EP) .................................... 11305853

(51) Int. Cl.
*G11B 7/20* (2006.01)
*G11B 7/003* (2006.01)

(52) U.S. Cl.
CPC .............. *G11B 7/003* (2013.01); *G11B 7/0032* (2013.01)
USPC ......................................................... 369/97

(58) Field of Classification Search
USPC ......................................................... 369/97
See application file for complete search history.

(56) References Cited

U.S. PATENT DOCUMENTS

| | | | |
|---|---|---|---|
| 3,659,950 A | | 5/1972 | Troll et al. |
| 4,365,257 A | * | 12/1982 | Gerfast ....................... 346/135.1 |
| 6,151,287 A | | 11/2000 | Labeyrie |
| 6,442,296 B1 | * | 8/2002 | Smith et al. .................... 382/237 |
| 6,650,815 B2 | * | 11/2003 | Hawtof et al. ................. 385/128 |
| 7,095,925 B2 | * | 8/2006 | Grunnet-Jepson et al. ..... 385/37 |
| 7,369,483 B2 | * | 5/2008 | Slafer et al. ................. 369/275.4 |
| 2006/0013108 A1 | * | 1/2006 | Maxwell et al. .......... 369/112.01 |
| 2008/0205840 A1 | | 8/2008 | Wakabayashi et al. |
| 2011/0141871 A1 | | 6/2011 | Becker-Szendy et al. |

FOREIGN PATENT DOCUMENTS

WO   WO2006049266 A1   5/2006

OTHER PUBLICATIONS

European Search Report dated Nov. 25, 2011.
Bian et al: "Erasable Holographic Recording in Photosensitive Polymer Optical Fibers", Optics Letters, vol. 28, No. 11, Jun. 1, 2003, pp. 929-931.
Del Campo et al.: "Generating Micro- and Nanopatterns on Polymeric Materials", Wiley-VCH, Weinheim, Germany, Mar. 1, 2011, pp. 1-21.
Dupont, "Tynex Diamond Gloss Filament", The Miracles of Science, filaments.dupont.com, Jan. 1, 2007, pp. 1-2.
Dupont, "Tynex Standard Filament", The Miracles of Science, filaments.dupont.com; Jan. 1, 2007, pp. 1-2.
Article entitled: "Hybrid material enables power-producing fabrics", http://www.theengineer.co.uk/news/hybrid-material-enables-power-producingfabrics/1005796.article; Oct. 29, 2010, p. 1.

(Continued)

*Primary Examiner* — Brenda Bernardi
(74) *Attorney, Agent, or Firm* — International IP Law Group, PLLC

(57) ABSTRACT

A method and an apparatus for data storage based on fibers are described. Data are stored as marks in a surface of a fiber or in a volume near the surface of the fiber. Data marks are written to or read from the fiber by irradiating the surface of the fiber with at least one radiation beam. The fiber has calibration marks for controlling a speed of the fiber relative to the at least one radiation beam.

20 Claims, 4 Drawing Sheets

(56) References Cited

OTHER PUBLICATIONS

Jackson, "Microfabrication and Nanomanufacturing", 2006 by Taylor & Francis Group, LLC; Published in 2006 by CRC Press Taylor & Francis Group, Nov. 10, 2005, pp. 1-388.

Knittel et al., "Surface Structuring of Synthetic Polymers by UV-Laser Irradiation. Part IV. Applications of Excimer Laser Induced Surface Modification of Textile Materials", Polymer International 45, Jan. 1, 1998, pp. 110-117.

Menchaca-Campos et al., "Long-Term Irradiation Effects On Gamma-Irradiated Nylon 6,12 Fibers", J. Mater. Res., vol. 23, No. 5, May 2008, pp. 1276-1281.

NIST Status Report 95-03-0023—LOTS Technology; Research and data for Status Report 95-03-0023 were collected during Nov. 2004-Mar. 2005, Mar. 30, 2006, pp. 1-5.

Article entitled "OECD_Remaking the Movies"; www.oecd.org/publishing/corrigenda, May 15, 2008, pp. 1-135.

Raciukaitis et al., "Processing Of Polymer by UV Picosecond Lasers", Paper # M403 Laboratory for Applied Research, Institute of Physics, Oct. 31, 2005, pp. 1-9.

Suzuki et al., "Application of CO2 laser heating zone drawing and zone annealing to Nylon 6 Fibers", Journal of Applied Polymer Science, vol. 83, Feb. 22, 2002, pp. 1711-1716.

Wagner, "Imec leads development of stretchable electronic fabrics"; http://www.theengineer.co.uk/news/imec-leads-development-of-stretchable-electronicfabrics/1005895.article; Nov. 8, 2010, pp. 1-2.

Zyung et al., "Ultrafast imaging of 0.532-μm laser ablation of polymers: Time Evolution of Surface Damage and Blast Wave Generation"; J. Appl. Phys. 65 (12), Jun. 15, 1989, pp. 4548-4563.

Ikawa et al., "Near Field Optical Recording On Azopolymer Using A Sub-Microsecond Pulse", IEICE Transactions on Electronics, vol. E85-C, No. 6: Jun. 2002, pp. 1287-1290.

\* cited by examiner

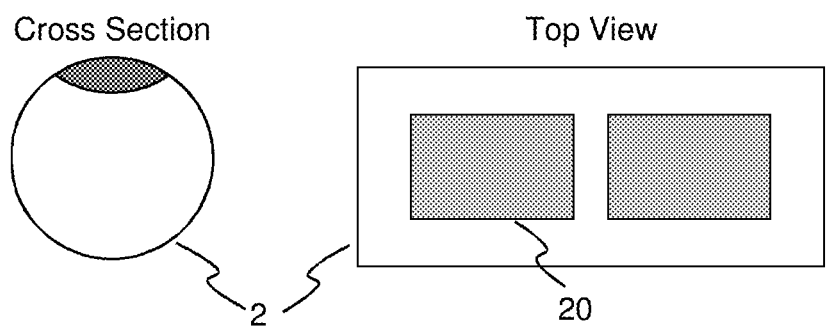
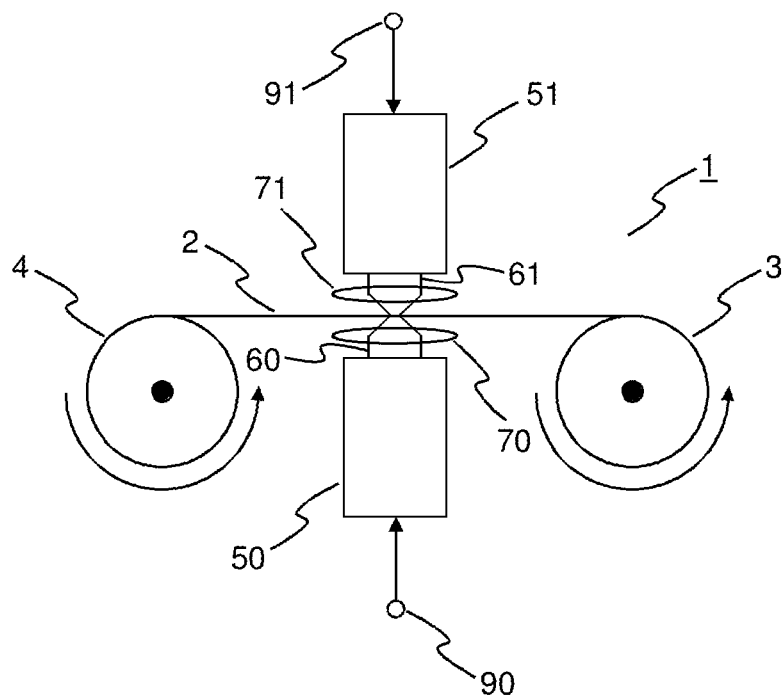

METHOD AND APPARATUS FOR DATA STORAGE

This application claims the benefit, under 35 U.S.C. §119 of EP Patent Application 11305853.1, filed 1 Jul. 2011.

FIELD OF THE INVENTION

The invention relates to a method and to an apparatus for data storage, and more specifically to a method and to an apparatus for data storage based on fibers.

BACKGROUND OF THE INVENTION

Especially in the media industry huge amount of digital production data are being produced. For example, every movie produced in the 4 k digital cinema format leads, conservatively calculated, to as much as at least 12.5 TByte, assuming a frame rate of 24 Hz and a color resolution of 16 bit for every of the three (RGB) color-channels. Since not only the final movie data are produced, but also some additional scenes and their variations, for the above estimation the average length of all the corresponding movie data is assumed to add up to a total duration of 180 min.

According to the Organization for Economic Co-operation and Development in the US about 700 cinema movies have been produced in 2005. Since there are 9 major studios in the US, each studio produces about 950 TByte of data each year. In this respect it needs to be emphasized that this value is based on a very conservative calculation. In praxis, there will be much more digital data generated by each of the studios, which needs to be archived.

The produced media data represent an important asset of a film studio. During the pre- and post-production phase the gathered and generated media data are generally stored on hard disk drives. Since typical hard disk drives only have a guaranteed life-span of about five years, it is not advisable to use hard disk drives for long archival of the data.

Unfortunately, there is today no really reliable long-term mass storage technology available at reasonable costs, which would allow to directly archive the produced digital data. All typically employed mass storage technologies, e.g. tapes, digital versatile disks (DVD) or Blu-ray disks (BD) as well as some less common optical storage disks, do not provide the necessary durability of several decades. As a result, these mass storage technologies require high maintenance costs since the stored data needs to be copied to new media before the end of the life-span of the storage media.

U.S. Pat. No. 6,151,287 discloses a mass optical memory having a photo-sensitive layer formed on an optical disc, which includes elementary cells distributed across its free surface, for recording data with a laser beam. For each elementary cell the optical memory comprises a light guiding rod operative as a single-mode optical fiber, made from a photo-sensitive material, the axis of which is approximately orthogonal to the free recording surface. The optical memory has an increased storage density, but is rather difficult to manufacture due to the complex structure that needs to be produced.

In the document S. Bian et al.: "Erasable holographic recording in photosensitive polymer optical fibers", Appl. Opt. Vol. 28 (2003), pp. 929-931, it has been proposed to store data as holograms in special optical fibers. However, as the necessary polymer optical fibers, which are doped with dye material, are costly to manufacture and are only available with rather short lengths, this approach is not suitable for mass storage. Also, the holograms need to be illuminated along the fiber axis. Due to the absorption caused by the dye material, which amounts to ~0.7 $cm^{-1}$, propagation of the reading or recording light along the fiber is confined to a couple of centimeters.

In this regard US 2011/0141871 discloses a method and an apparatus for storing data in an optical fiber. The bulk of the fiber is irradiated with a powerful irradiation beam in order to modify a characteristic of the bulk for data storage. Modification of the bulk of the fiber ensures a reliable storage of the data for a long period. However, the achievable data density is rather small.

SUMMARY OF THE INVENTION

It is thus an object of the invention to propose a reliable long-term archival technology with an increased data density.

According to one aspect of the invention, an apparatus for writing to a fiber has at least one radiation source for emitting at least one radiation beam for writing to the fiber. In order to write marks into a surface of the fiber, the surface of the fiber is irradiated with the at least one radiation beam to generate holes in the surface of the fiber or to induce changes of an optical property of the material of the fiber close to the surface of the fiber.

Similarly, a method for writing to a fiber comprises the steps of:
generating at least one radiation beam with at least one radiation source for writing to the fiber, and
writing marks into a surface of the fiber by irradiating the surface of the fiber with the at least one radiation beam to generate holes in the surface of the fiber or to induce changes of an optical property of the material of the fiber close to the surface of the fiber.

According to a further aspect of the invention, an apparatus for reading from a fiber has at least one radiation source for emitting at least one radiation beam for reading from the fiber. In order to read marks from a surface of the fiber, the surface of the fiber is irradiated with the at least one radiation beam and radiation reflected by the fiber or transmitted through the fiber is detected.

Likewise, a method for reading from a fiber comprises the steps of:
generating at least one radiation beam with at least one radiation source for reading from the fiber, and
reading marks from a surface of the fiber by irradiating the surface of the fiber with the at least one radiation beam and detecting radiation reflected by the fiber or transmitted through the fiber.

A main idea of the invention is to store the data to be archived on the surface or in a volume near the surface of a simple fiber, e.g. an optical fiber. Preferably a polymer fiber, e.g. a Nylon fiber or a polyamide fiber, is used for data storage. Polymer fibers are well established and easy to manufacture. Of course, other types of fibers may likewise be used. Advantageously, the radiation source is a light source, e.g. a laser diode, which emits a visible light beam or a UV or infrared light beam. Of course, other radiation sources such as X-ray sources or the like may likewise be used.

In order to read or write data, the rolled up fiber is unwound from a dispenser spindle mounted on a first mount and lead past the radiation beam. The fiber is then rolled up again by a winder spindle mounted on a second mount. When data are to be recorded, the radiation source generates a modulated radiation beam, which changes the properties of the fiber material in accordance with the modulation. In this way the data are stores while the fiber passes the radiation beam. For reading the fiber is irradiated with the radiation beam and the radiation reflected by the fiber or transmitted through the fiber is detected. As the detected radiation is modulated in accordance with the material changes of the fiber, the originally recorded data can be retrieved from the detected radiation.

The use of fibers for data storage has a plurality of advantages. For example, polymer fibers are hard-wearing. They resist water and vapor and even acid chemicals, and they are non-fading. The warehousing of polymer fibers does not require any expensive cooling, no special demands on humidity control, no unusual fire protection measures. In addition, the applied technologies are well known, while the degree of complexity is comparable low. All components are available from the shelf and will be available in the future. A further important aspect is that the technology and the fibers are very inexpensive. The total owner costs of fiber-based storage archives are thus comparably low.

Advantageously, two radiation sources are provided for emitting two radiation beams. In this case the two radiation sources are preferably arranged on opposite sides of the fiber. This solution has the advantage that an increased data rate is achieved. At the same time only part of the surface of the fiber is used for data storage. Therefore, the remaining surface can be used for the mechanical feeding of the fiber without any risk of damaging the recorded data. Alternatively, four radiation sources are provided for emitting four radiation beams. Favorably, these four radiation sources are arranged crosswise around the fiber. This allows to further increase the achievable data rate.

Preferably, at least one actuator is provided for adjusting a position and/or an orientation of the fiber relative to the at least one radiation beam. This ensures that during recording and reading the fiber is led past the radiation beam in a well-defined manner. Alternatively or in addition, favorably a controller is provided for controlling a speed of the fiber relative to the at least one radiation beam. Advantageously, the controller evaluates calibration marks of the fiber for controlling the speed of the fiber relative to the at least one radiation beam. These calibration marks allow to easily synchronize the speed of the fiber relative to the radiation beam with the data pattern to be recorded or to be retrieved.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

FIG. 4 shows a further apparatus according to the invention that makes use of two lasers.

DETAILED DESCRIPTION OF PREFERRED EMBODIMENTS

In the following the invention will be explained in more detail with reference to an optical fiber, using a laser as the source of a light beam. Of course, other types of radiation beams and radiation sources can likewise be used.

Figure 1:
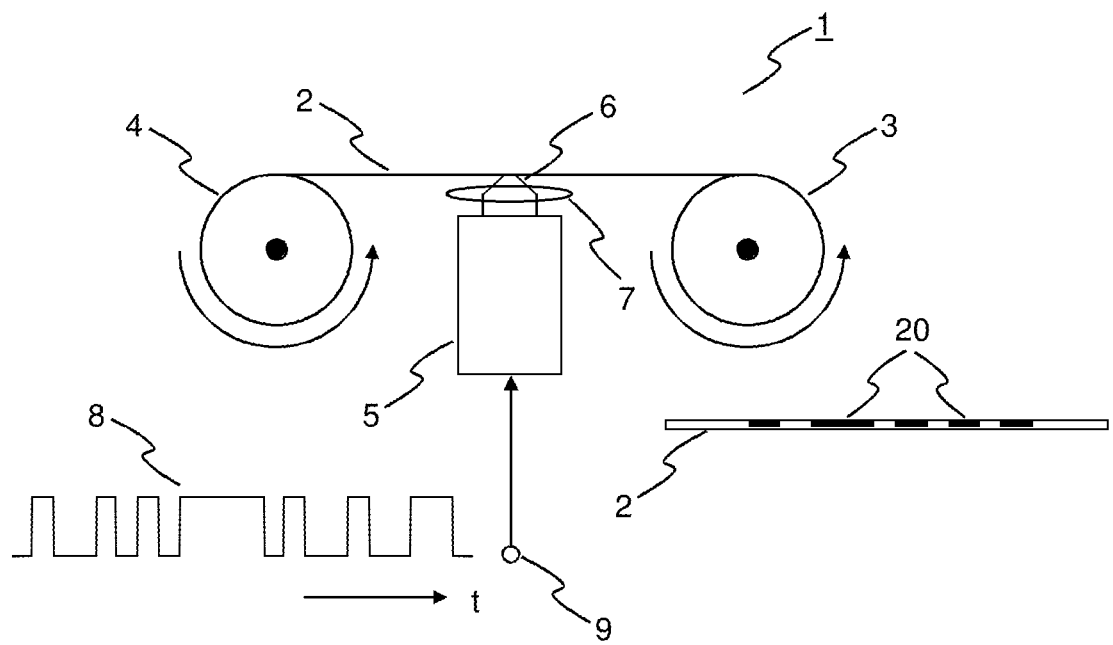
FIG. 1 schematically depicts an apparatus according to the invention.

FIG. 1 schematically depicts an apparatus 1 according to the invention for optical fiber storage. An optical fiber 2 is unwind from a dispenser spindle 3 and rolled up by a winding spindle 4. A laser 5 emits a light beam 6, which is focused onto the optical fiber 2 by an objective lens 7. The light beam 6 is modulated in accordance with a data signal 8, which is received at an input 9 of the laser 5. The modulated light beam 6 causes changes of the material of the optical fiber 2 while the optical fiber 2 passes the light beam 6. These changes of the material of the optical fiber 2 represent data marks 20 and are used for storing the data contained in the data signal 8.

A plurality of variants are available for implementing the invention. In the following it is assumed that the optical fiber is a polymer fiber. Of course, Nylon and polyamide fibers or other types of fibers can likewise be used as storage media. The data marks 20 may be recorded in the fiber in different ways.

Figure 2:
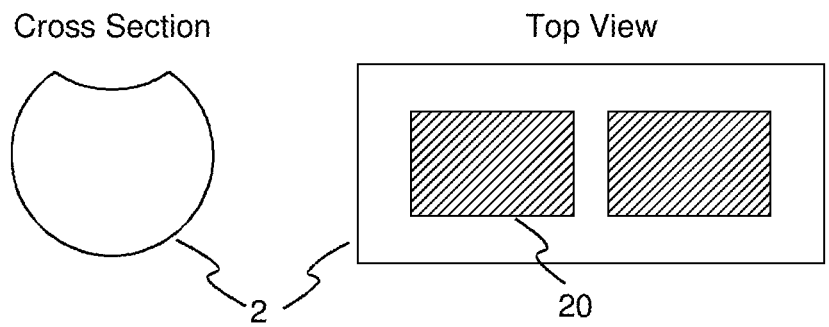
FIG. 2 schematically illustrates a first example of an optical fiber with recorded marks, FIG. 3 schematically depicts a second example of an optical fiber with recorded marks.

A first possibility is schematically depicted in FIG. 2, which in the left part shows a cross section and in the right part shows a top view of an optical fiber 2, respectively. In this example pits are burned into the surface of the optical fiber 2 by the high-energy light beam 6. Advantageously, the light beam 6 is controllable to burn pits with different extensions and/or different depths into the surface of the optical fiber 2. In this way several levels of information can be stored. If, for instance, three different pits can be burned, then every single pit stores two bits of information.

A second possibility is illustrated in FIG. 3, which in the left part shows a cross section and in the right part shows a top view of an optical fiber 2, respectively. In this example the data marks 20 are formed by areas in which the optical properties of the material of the optical fiber 2, e.g. the diffraction characteristics, are modified. Again, by generating different amounts of material changes several levels of information can be stored.

Of course, depending of the material of the optical fiber further coding principles are conceivable. For example, provided suitable material characteristics, the laser beam could curl the original smooth filament. In this case a spot that has been curled could mean a logical '1', while an area of the optical fiber in its original state would indicate a logical '0'.

In all of the above examples the stored information can easily be retrieved by detecting the changes caused to the optical fiber 2.

Figure 5:
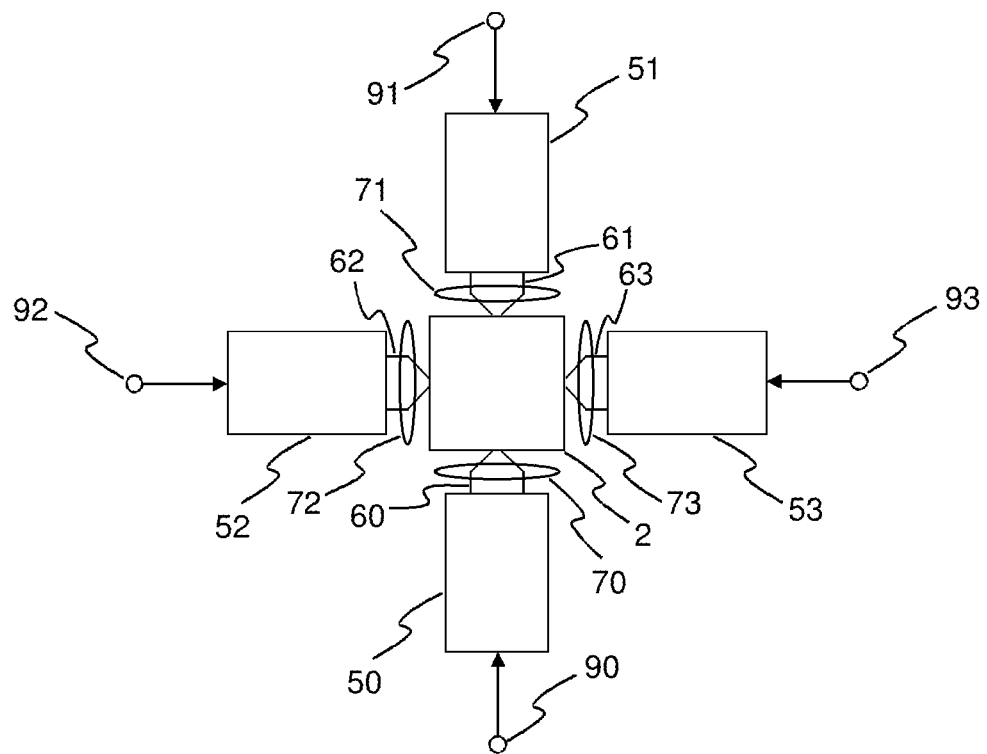
FIG. 5 depicts an apparatus according to the invention that makes use of four lasers.

In FIG. 1 only one single laser is used for recording the information in the optical fiber. In order to increase the storage density, the operating mechanism is advantageously extended using more than just one light beam 3 for recording the information. FIG. 4 illustrates a recording apparatus that makes use of two lasers 50, 51, and hence of two light beams 60, 61 and two objective lenses 70, 71, while FIG. 5 depicts a recording apparatus with four lasers 50, 51, 52, 53, and hence four light beams 60, 61, 62, 63 and four objective lenses 70, 71, 72, 73. In the latter example preferably a diamond shaped optical fiber 2 is used. However, a normal optical fiber 2 with a circular cross section can likewise be used. In FIG. 5 each surface of the optical fiber 2 is illuminated with a single light beam 60, 61, 62, 63. Of course, provided a sufficiently large width of the optical fiber 2, it is likewise possible illuminate one or more of the four surfaces with more than one light beam. In this case the data are preferably arranged in two or more track parallel to the axis of the optical fiber 2.

In order to retrieve data focused laser light is directed to the optical fiber 2. A suitably placed sensor then detects the light that is reflected by the optical fiber 2. As during recording the optical characteristics of the optical fiber 2 are modified, the encoded data can be retrieved from the modulation of the reflected light that is caused by the modified optical characteristics.

Figure 6:
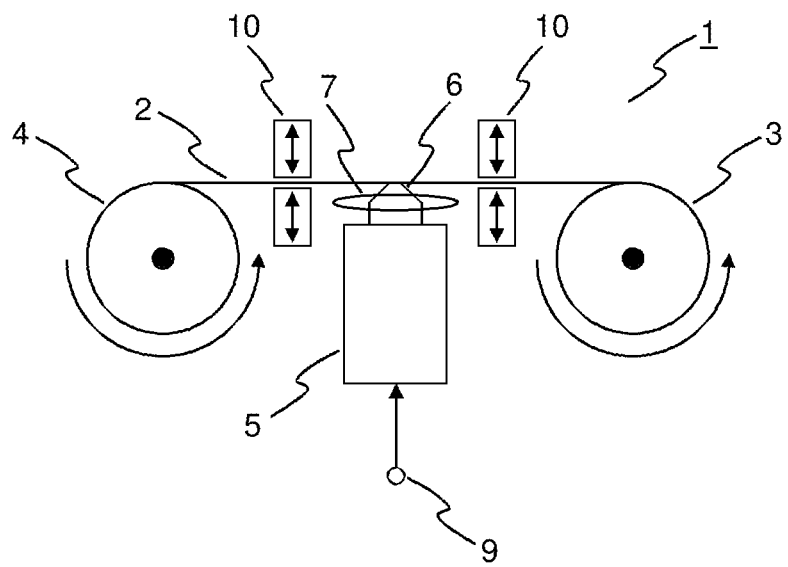
FIG. 6 illustrates an apparatus according to the invention that is provided with actuators for controlling the position and orientation of an optical fiber.
Figure 7:
FIG. 7 shows an optical fiber with calibration marks.

During recording and reading the optical fiber 2 has to be led past the recording/reading laser 2 in a well-defined manner. Therefore, in practice additional means have to be provided to ensure the correct orientation and lead of the optical fiber 2 relative to the focused light beam. One possible solution is illustrated in FIG. 6, where common actuators 10 are provided for adjusting the position and orientation of the optical fiber 2. Apparently, adjusting the position and orientation of the optical fiber 2 is greatly facilitated when a diamond shaped optical fiber 2 is used. In any case, apart from the correct position and orientation of the optical fiber 2, the optical fiber 2 has to be lead past the light beam 6 with the correct velocity. For this purpose the optical fiber 2 is advantageously provided with calibration marks 21, as illustrated in FIG. 7. These calibration marks 21 allow to easily synchronize the velocity of the optical fiber 2 relative to the focused light beam 6 with the data pattern to be recorded or to be retrieved.

The following Table 1 summarizes exemplary values for an optical fiber 2 capable of storing 12.5 TByte of data. The values are based on currently available technology, i.e. technology employed for BluRay Disks. Assuming a data rate of approximately 10 MByte per second, the time required for storing the amount of 12.5 TByte data sums up to about 15 days. The speed of the optical fiber 2 relative to the focused light beam 6 is set to 5.125 m/sec.

TABLE 1

| | |
|---|---|
| Amount of data | 12.5 TByte |
| Stored data per mm fiber | ~2 kbit (one level coding) |
| Fiber length | ~54 × 10³ km |
| Fiber diameter | 0.1 mm |
| Total fiber volume | 0.135 m³ |
| Fiber spindle | 30 cm × 75 cm (cross-section × height) |
| Data rate | 10 MByte/sec |
| Recording time | ~365 hours, i.e. ~15 days |
| Fiber speed | ~5.125 m/sec |

The preceding figures are based on pure Pulse Coded Modulation (PCM). Applying a JPEG 2000 encoder, which shows a compression ratio of about 1 to 6 or 1 to 10, would lead to considerably smaller values. However, application of an Error Correction Code (ECC) would slightly increase the values.

What is claimed, is:

1. An apparatus for writing data to a diamond-shaped polymer fiber, with two or more light sources for emitting two or more light beams for writing data to the diamond-shaped polymer fiber, wherein the apparatus writes marks into a surface of the diamond-shaped polymer fiber along two or more tracks parallel to an axis of the diamond-shaped polymer fiber by independently irradiating the surface of the diamond-shaped polymer fiber with the two of more light beams in accordance with the data to be written to generate holes in the surface of the diamond-shaped polymer fiber or to induce changes of an optical property of a material of the diamond-shaped polymer fiber close to the surface of the diamond-shaped polymer fiber.

2. An apparatus for reading data from a diamond-shaped polymer fiber, with two or more light sources for emitting two or more light beams for reading data from the diamond-shaped polymer fiber, wherein the apparatus reads marks from a surface of the diamond-shaped polymer fiber along two or more tracks parallel to an axis of the diamond-shaped polymer fiber by irradiating the surface of the diamond-shaped polymer fiber with the two or more light beams, for each of the two or more light beams detecting light reflected by the diamond-shaped polymer fiber, and retrieving data from the light detected for each of the two or more light beams.

3. The apparatus according to claim 1, wherein the apparatus has two light sources for emitting two light beams or four light sources for emitting four light beams.

4. The apparatus according to claim 3, wherein the two light sources are arranged on opposite sides of the diamond-shaped polymer fiber or the four light sources are arranged cross-wise around the diamond-shaped polymer fiber.

5. The apparatus according to claim 1, further comprising at least one actuator for adjusting a position or an orientation of the diamond-shaped polymer fiber relative to the two or more light beams or a controller for controlling a speed of the diamond-shaped polymer fiber relative to the two or more light beams.

6. The apparatus according to claim 5, wherein the controller evaluates calibration marks of the diamond-shaped polymer fiber for controlling the speed of the diamond-shaped polymer fiber relative to the two or more light beams.

7. The apparatus according to claim 1, further comprising a first mount for a dispenser spindle for the diamond-shaped polymer fiber and a second mount for a winder spindle for the diamond-shaped polymer fiber.

8. A method for writing data to a diamond-shaped polymer fiber, the method comprising:
generating two or more light beams with two or more light sources for writing data to the diamond-shaped polymer fiber, and
writing marks into a surface of the diamond-shaped polymer fiber along two or more tracks parallel to an axis of the diamond-shaped polymer fiber by independently irradiating the surface of the diamond-shaped polymer fiber with the two or more light beams in accordance with the data to be written to generate holes in the surface of the diamond-shaped polymer fiber or to induce changes of an optical property of a material of the diamond-shaped polymer fiber close to the surface of the diamond-shaped polymer fiber.

9. A method for reading data from a diamond-shaped polymer fiber, the method comprising:
generating two or more light beams with two or more light sources for reading data from the diamond-shaped polymer fiber,
irradiating a surface of the diamond-shaped polymer fiber with the two or more light beams along two or more tracks parallel to an axis of the diamond-shaped polymer fiber, for each of the two or more light beams,
detecting light reflected by the diamond-shaped polymer fiber, and
retrieving data from the light detected for each of the two or more light beams.

10. The method according to claim 8, wherein two light beams are generated by two light sources or four light beams are generated by four light sources.

11. The method according to claim 8, further comprising adjusting a position or an orientation of the diamond-shaped polymer fiber relative to the two or more light beams with at least one actuator or controlling a speed of the diamond-shaped polymer fiber relative to the two or more light beams with a controller.

12. The method according to claim 11, wherein controlling the speed of the diamond-shaped polymer fiber relative to the two or more light beams comprises evaluating calibration marks of the fiber.

13. The method according to claim 9, wherein two light beams are generated by two light sources or four light beams are generated by four light sources.

14. The method according to claim 9, further comprising adjusting a position or an orientation of the diamond-shaped polymer fiber relative to the two or more light beams with at least one actuator or controlling a speed of the diamond-shaped polymer fiber relative to the two or more light beams with a controller.

15. The method according to claim 14, wherein controlling the speed of the diamond-shaped polymer fiber relative to the two or more light beams comprises evaluating calibration marks of the diamond-shaped polymer fiber.

16. The apparatus according to claim 2, wherein the apparatus has two light sources for emitting two light beams or four light sources for emitting four light beams.

17. The apparatus according to claim 16, wherein the two light sources are arranged on opposite sides of the diamond-shaped polymer fiber or the four light sources are arranged cross-wise around the diamond-shaped polymer fiber.

18. The apparatus according to claim 2, further comprising at least one actuator for adjusting a position or an orientation of the diamond-shaped polymer fiber relative to the two or more light beams or a controller for controlling a speed of the diamond-shaped polymer fiber relative to the two or more light beams.

19. The apparatus according to claim 18, wherein the controller evaluates calibration marks of the diamond-shaped polymer fiber for controlling the speed of the diamond-shaped polymer fiber relative to the two or more light beams.

20. The apparatus according to claim 2, further comprising a first mount for a dispenser spindle for the diamond-shaped polymer fiber and a second mount for a winder spindle for the diamond-shaped polymer fiber.

* * * * *